S. H. JONES & E. CHRISTMAN.
SEEDING MACHINE.
APPLICATION FILED AUG. 17, 1912.
1,051,958.
Patented Feb. 4, 1913.
4 SHEETS—SHEET 1.
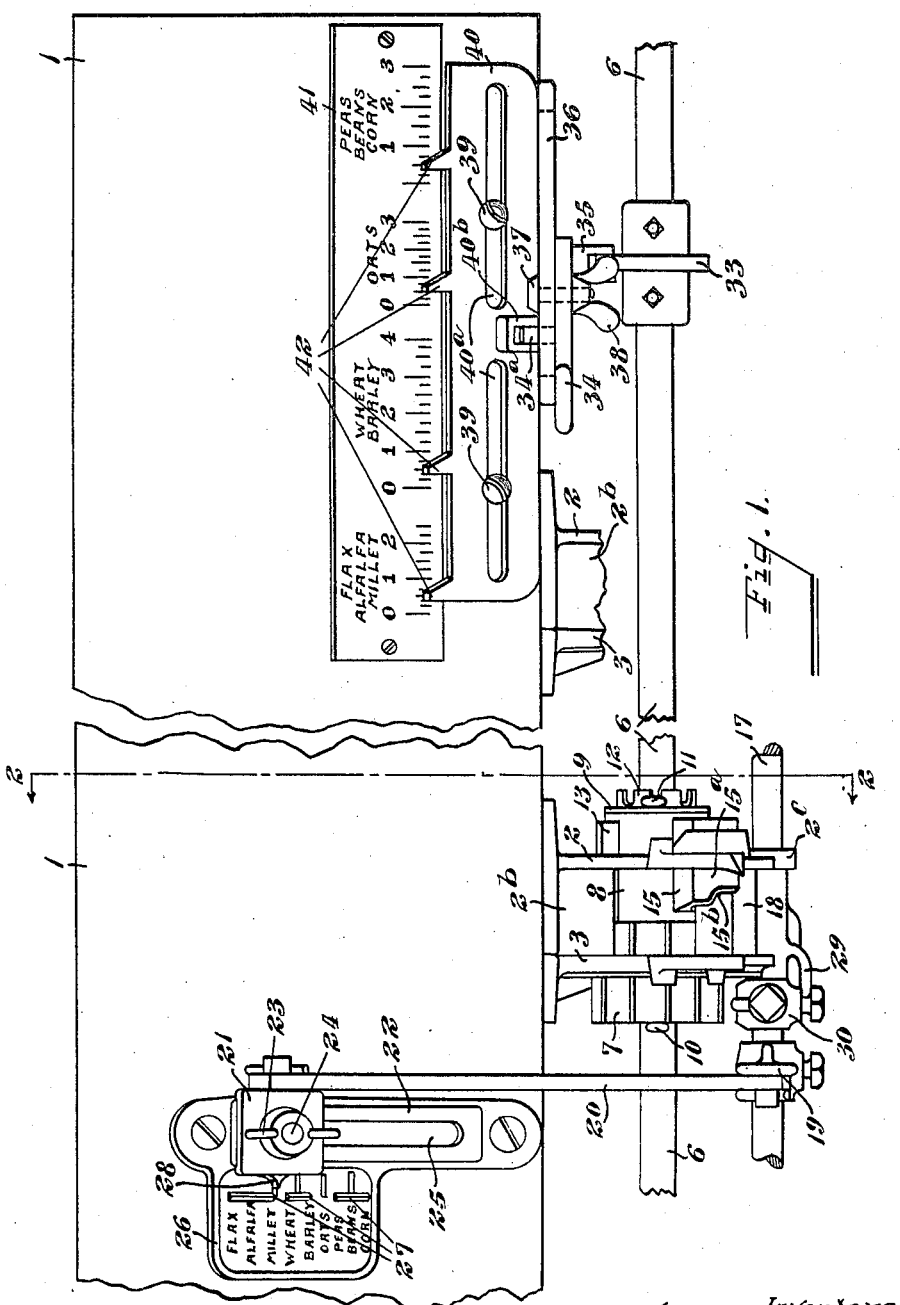

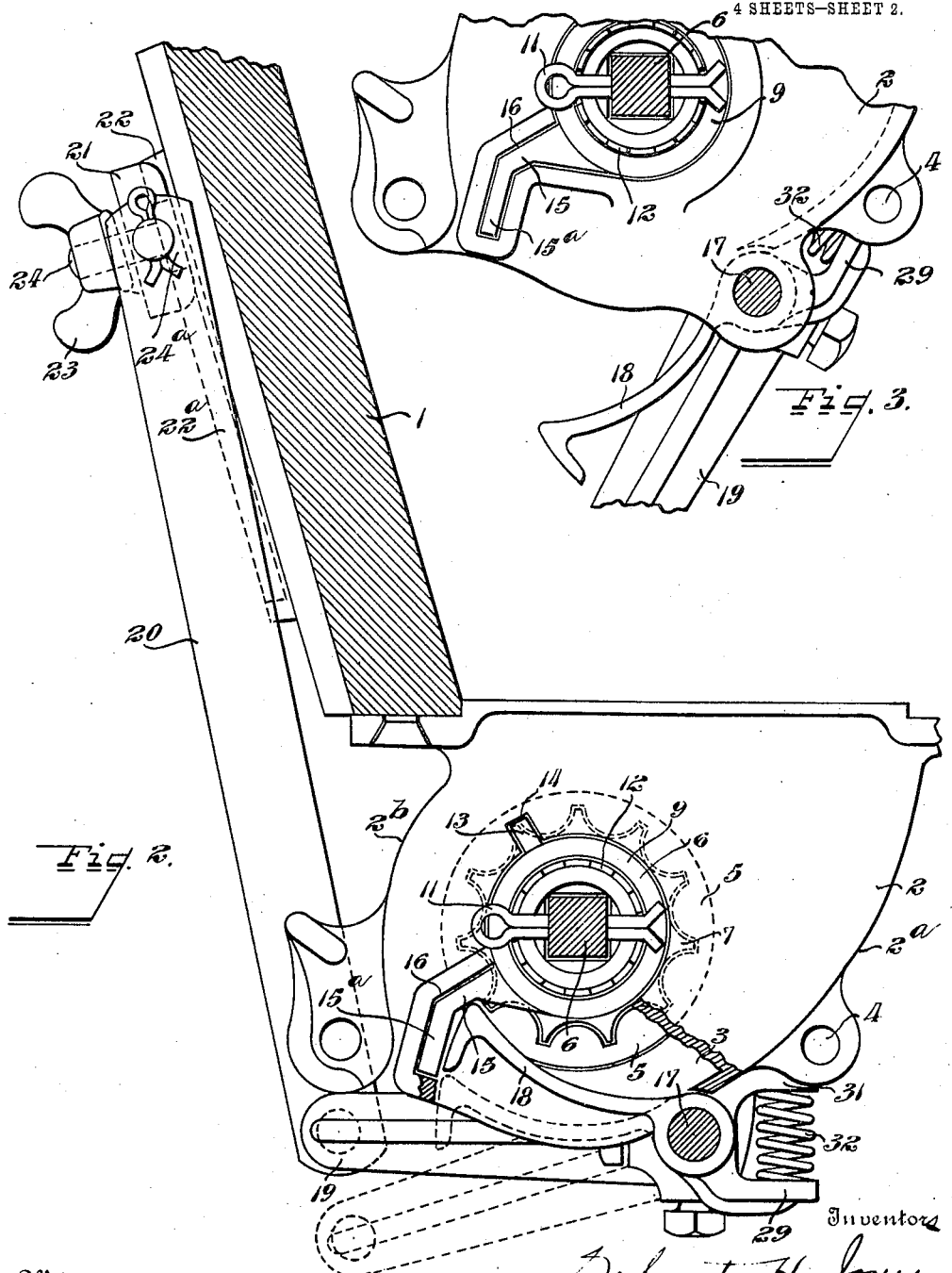

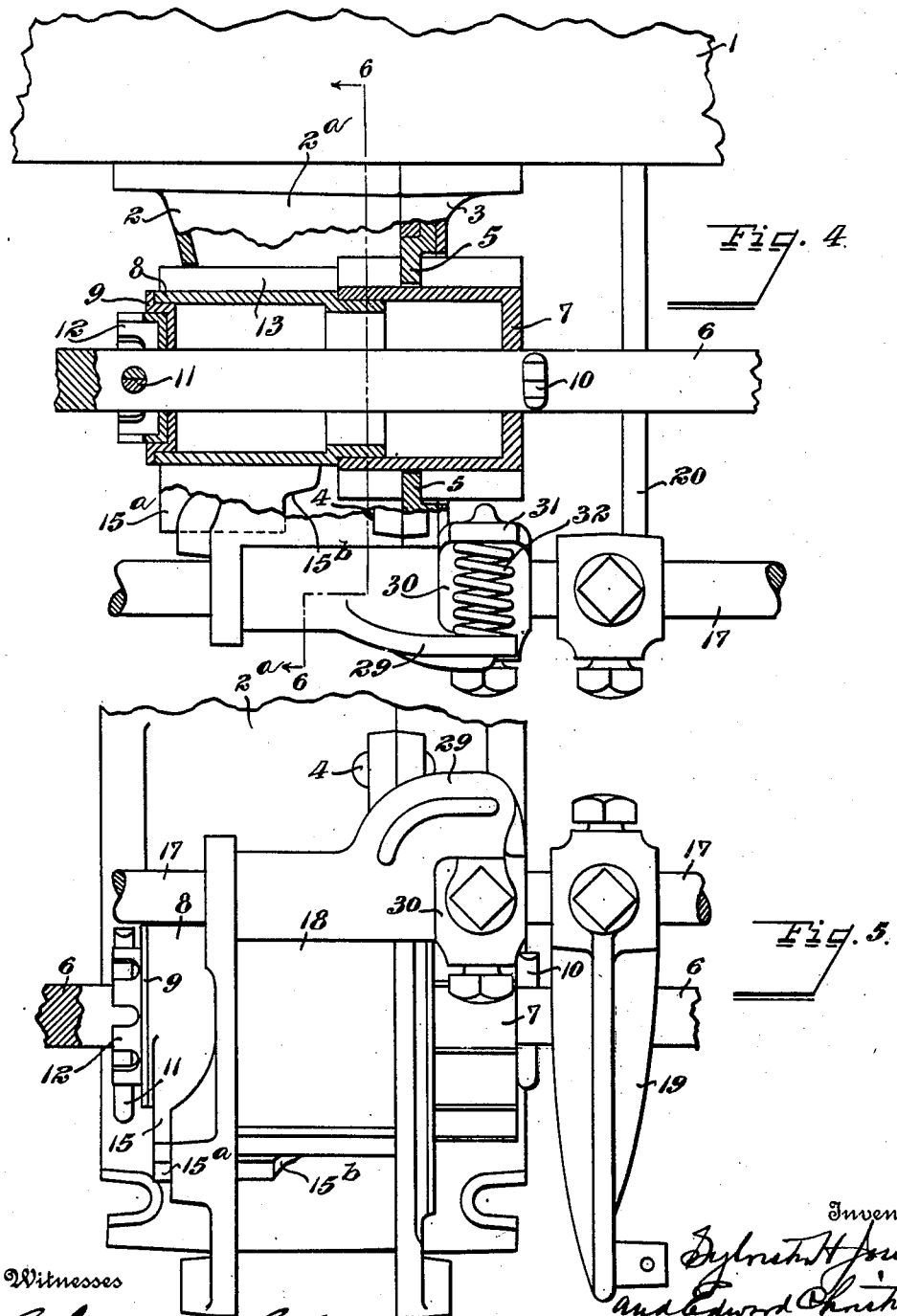

S. H. JONES & E. CHRISTMAN.
SEEDING MACHINE.
APPLICATION FILED AUG. 17, 1912.
1,051,958.
Patented Feb. 4, 1913.
4 SHEETS—SHEET 4.
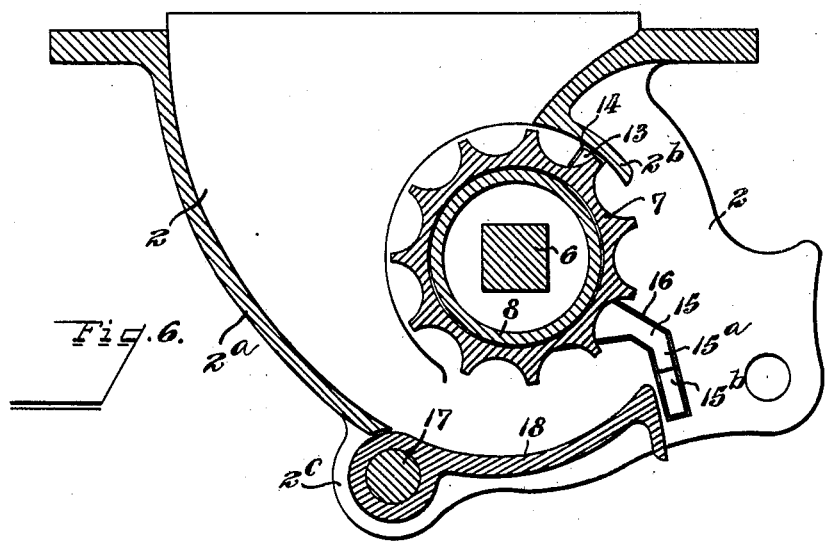
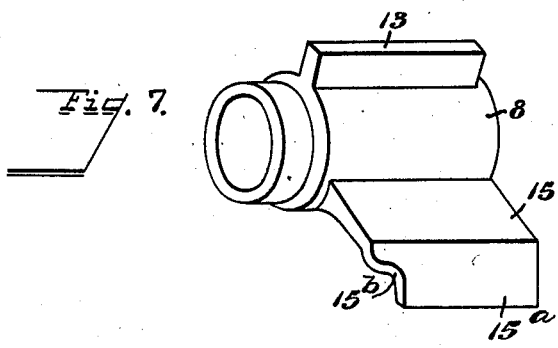
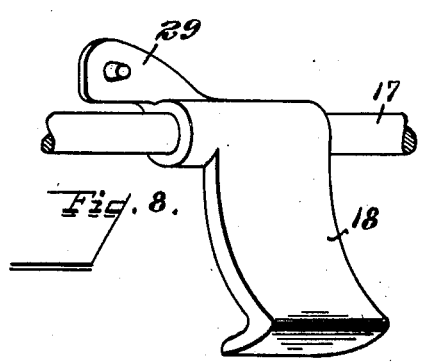
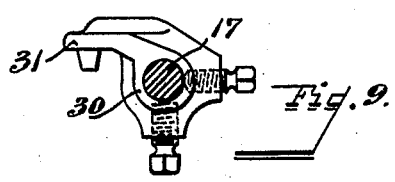

UNITED STATES PATENT OFFICE.

SYLVESTER H. JONES, OF RICHMOND, INDIANA, AND EDWARD CHRISTMAN, OF LOUISVILLE, KENTUCKY, ASSIGNORS TO THE AMERICAN SEEDING MACHINE COMPANY, OF SPRINGFIELD, OHIO, A CORPORATION OF OHIO.

SEEDING-MACHINE.

1,051,958.  Specification of Letters Patent.  Patented Feb. 4, 1913.

Application filed August 17, 1912. Serial No. 715,584.

*To all whom it may concern:*

Be it known that we, SYLVESTER H. JONES, a citizen of the United States, residing at Richmond, in the county of Wayne and State of Indiana, and EDWARD CHRISTMAN, a citizen of the United States, residing at Louisville, in the county of Jefferson and State of Kentucky, have invented certain new and useful Improvements in Seeding-Machines, of which the following is a specification.

This invention relates to improvements in distributing devices for seeding machines, and more particularly to that type of distributing device which employs a fluted feed wheel which revolves at a constant speed and which is shiftable endwise through the feed cup to vary the quantity of seed sown.

An object of the invention is to provide a force feed distributer of the type referred to which may be readily adjusted to most effectively and accurately sow seeds of different character in varying quantities.

A further object of the invention is to provide a distributing device which may be quickly and readily emptied of the seed contained therein.

A further object of the invention is to provide for adjusting the throat of the distributing device to adapt it to the distributing of seeds of varying sizes and irregular shape in an even and uniform manner with no danger of cracking or breaking the seeds.

A further object of the invention is to provide a distributer, the throat of which will be yieldable in its character to obviate any danger of breakage or straining of the parts in the event of the entrance thereto of any hard foreign substance.

A further object of the invention is to provide means for readily indicating the different positions to which the distributing device may be adjusted for seeds of different character and also for quantity.

A further object of the invention is to simplify and make more effective the operation of the devices of this character.

In the accompanying drawings:—Figure 1 is a rear view of a portion of the hopper of a grain seeding machine and some of the distributing devices shown in connection therewith. Fig. 2 is a vertical section on the line 2—2 of Fig. 1, part of the casing of the distributing device shown therein being broken away. Fig. 3 is a side elevation of a portion of one of the distributing devices showing the parts in a different position than that shown in Fig. 2. Fig. 4 is a front elevation of a portion of the hopper and one of the distributing devices, the casing of the distributing device being broken away and some of the parts shown in section. Fig. 5 is a bottom plan view of one of the distributing devices. Fig. 6 is a vertical section through one of the distributing devices, the section being taken on the line 6—6 of Fig. 4. Figs. 7 and 8 are detail views in perspective of portions of one of the distributing devices. Fig. 9 is a view showing the valve operating rod in section with one of the fixed collars, hereinafter referred to, shown in position thereon.

Like parts are represented by similar characters of reference in the several views.

In the said drawings, 1 represents the usual hopper of a seeding machine to the under side of which the seed cups are arranged in the usual manner, but one of these cups being shown in the drawings, although it will be understood that a series of them are provided.

The casing of the cup is in two parts, one part forming a side wall 2 and front and rear walls 2ª and 2ᵇ, and the other part forming the opposite side wall 3; said parts being riveted together as at 4. The cup is secured to the under side of the hopper 1 in any preferable manner.

The wall 3 of the cup has revolubly mounted therein the usual rosette washer 5. Extending transversely through the cup is the feed shaft 6 which has secured thereto so as to rotate therewith, the exteriorly fluted feed wheel 7; this fluted feed wheel being extended through and fitted to the rosette washer 5, which conforms to the shape thereof; said washer revolving therewith and serving to close the casing at that point.

A non-rotating sleeve, 8, has an inner reduced end loosely fitted in the bore of the feed wheel 7 and to the outer end of this sleeve is fitted a loose collar 9, rotatably connected to the feed shaft 6. The feed wheel 7 and sleeve 8 are movable transversely through the cup by shifting the feed shaft 6 in the manner and for the purpose hereinafter described and are held against longitudinal movement on said shaft by cotter pins 10 and 11; a washer 12 being fitted to the collar 9 and provided with a series of serrations to receive the pin 11, this construction permitting the parts to rotate with respect to the stationary sleeve 8 without undue friction. The sleeve 8 is provided with an upper cut-off 13 to close the space between said sleeve and the wall 2$^b$, which cut-off is slidably mounted in an aperture 14 in the wall 2. The sleeve 8 also has a lower cut-off 15 of peculiar construction, slidably mounted in a similarly shaped aperture 16 in the wall 2, this cut-off being described more in detail hereinafter.

Extending across and beneath the seed cups and located in suitable bearings 2$^c$ in the lower forward part of the wall 2 thereof, is a rock shaft 17.

The front wall 2$^a$ of each of the cups is curved rearwardly and terminates at a point substantially in line with the periphery of the feed wheel while the rear wall 2$^b$ terminates well above the axis of the feed wheel so that the entire bottom of the casing is open so far as the walls thereof are concerned. Connected to the rock shaft 17 is a valve 18 adapted to extend between the side walls 2 and 3 beneath the feed wheel and form in effect a continuation of the front wall 2$^a$; this valve 18 being curved to conform to the curvature of the front wall 2$^a$; the said front wall and valve in connection with the feed wheel forming a throat for the passage of the seed. Provision is made for adjusting the position of this valve 18 with respect to the feed wheel so as to vary the size of the throat or passage between the valve and wheel to adapt the same to the size of the seeds being sown. Extending rearwardly on the rock shaft 17 is an arm 19, to the free end of which is pivotally attached an upwardly extending rod 20. The upper end of the rod 20 is pivotally connected to a head 21, slidably mounted upon a guide 22 and adapted to be held in different positions of adjustment thereon by a thumb nut 23 on a headed screw 24; the head 24$^a$ of said screw being slidably mounted in the chambered portion 22$^a$ of said guide 22, as shown in dotted lines in Fig. 2, with the shank extending through the slotted opening 25 and also through the head 21 and screw-threaded on its end to receive the clamping nut 23. A table 26 having a series of indications 27 corresponding to the different seeds to be sown is adapted to coöperate with a pointer 28 on the head 21 so as to determine the position the head is to be adjusted for the sowing of a certain character of seed so as to cause the valves 18 to be adjusted correspondingly.

The valves are so connected with the rock shaft that they will be yieldably held in their adjusted positions so that in the event of any hard foreign substance being fed into the distributing device, the valves will yield to permit the passage of the same to obviate breakage or straining of the parts. The hub of the valve 18 is loosely mounted on the rock shaft and has a forwardly extending projection 29. Fixed to the shaft adjacent the hub of the valve is a collar 30 having a forward projection 31. Between these projections 29 and 31 is a spring 32. The projection 29 is off-set laterally so as to lie in the same plane as the collar 30 so that said collar and arm will form stops to limit the movement of said valve about the shaft due to the tension of the spring; the influence of said spring being to throw the valve 18 in a direction toward the periphery of the feed wheel and any yielding movement against the tension of the spring will be away from the feed wheel.

In order to regulate the quantity of the seed to be sown, means are provided for shifting the feed shaft and the devices carried thereby endwise so as to cause more or less of the periphery of the fluted seed wheel to be exposed in the cup. Fixed to the feed shaft 6 is a collar 33. Pivoted to the underside of the hopper 1 is a lever 34 carrying a yoke 35 which straddles the collar 33. Connected to the rear of the hopper 1 is a slotted guide 36 and through this guide and the lever 34 extends a bolt 37, the screw-threaded end of which has a clamping nut 38 which holds the lever in different positions of adjustment. Slidably mounted on the rear of the hopper 1 is a pointer frame 40, the slidable connection being made through the medium of headed screws 39 which project through the slotted openings 40$^a$ in the pointer frame and are screwed into the hopper. Projecting upwardly from the lever 34 is a pin 34$^a$, which extends into a slotted projection 40$^b$ on the pointer frame so that when the lever is shifted the frame will be shifted therewith. Located on the hopper above this pointer frame is a chart 41, divided in sections corresponding to the character of the seed and having indications for each section corresponding to the quantity to be sown. Coöperating with these indications are a series of pointers 42 on the pointer frame, one pointer for each section. By unloosing the clamping screw and shifting the lever it will be seen that the rock shaft 17 will be shifted so as to move the fluted feed wheel in or out of the casing of the seeding device so as to expose more or less of its surface in the casing to cause it to feed more or less of seed being sown. The shifting of the feed wheel also causes the sleeve 8 to be correspondingly shifted. The cut-off 15 projects downwardly and rearwardly from the sleeve 8 and also lies in close proximity to the feed wheel. This cut-off 15 also has a secondary projecting portion 15ª which projects downwardly in nearly a vertical direction and overlies the rear end of the valve 18. The end of the portion 15ª adjacent the feed wheel is recessed or cut away at an angle as indicated at 15ᵇ. The result of this construction is that the wider the valve 18 is opened the wider will be the discharge mouth, so that when the valve is adjusted for small seeds a comparatively narrow mouth is provided, while for the larger seeds the mouth will be enlarged in width as well as height to correspond with the size of the seed.

When it is desired to clean out the casing of the distributing device from the accumulated seed therein, such, for instance, as in changing from one seed to another, the valve 18 is dropped down to the position shown in Fig. 3, by throwing the head 21 down to the lowermost limit of the slot 25. It will be seen that the pivotal point for the valve is so located that the inner side of the valve forms a continuous line with the inside of the wall 2ª of the casing so that there will be no obstructing surfaces to prevent the seed from dropping out of the casing by gravity when the valve is thus opened.

Having thus described our invention, we claim:

1. In a seed distributer, a seed cup having an open bottom, a rotatable feed wheel in said cup, a valve pivotally connected with one of the walls of said cup and extending across the open bottom of said cup, the interior of said valve adjacent the pivotal point thereof standing flush with the wall of said cup so as to provide an unobstructed passage for the seed, and means for adjusting said valve to and from the said feed wheel to vary the size of the discharge passage of the seed carried by said wheel, and means for throwing said valve completely open to permit the discharge of the grain from said cup independently of the movement of said wheel.

2. In a seed distributer, a seed cup, a feed wheel, a valve coöperating with said wheel to form a measuring channel, devices for adjusting said valve to vary the height of said channel, and means coöperating with said valve for varying the width of said channel to correspond to the variation in height thereof.

3. In a seed distributer, a seed cup, a longitudinally-movable feed wheel, a valve coöperating with said wheel to form a measuring channel, devices for adjusting said valve to vary the height of said channel, and a cutoff movable with said wheel and coöperating with said valve, said cut-off being so constructed and arranged that as said valve is adjusted to vary the height of said channel the width of said channel will be correspondingly varied.

4. In a seed distributer, a seed cup formed with an open bottom, a rotatable feed wheel longitudinally movable in said cup, a pivoted valve extending across the open bottom of said cup and forming with said wheel a measuring channel for seed, means for adjusting said valve to vary the size of said channel, a cut-off movable with said wheel and inclosing the end of said valve, said cut-off being provided with an inclined end adjacent said wheel to vary the width of said channel as said valve is adjusted to vary the height thereof.

5. In a seed distributer, a seed cup formed with an open bottom, a rotatable shaft extending through said cup and movable longitudinally, a fluted feed wheel connected with said shaft and movable therewith through said cup, a stationary sleeve loosely mounted about said shaft but movable longitudinally therewith, a pivoted valve inclosing the open bottom of said cup, a cut-off on said sleeve projecting in proximity to the free end of said valve, the end of said cut-off adjacent said valve being inclined to increase the width of said channel as said valve is adjusted to increase the height thereof.

6. In a seed distributer, a seed cup formed with open bottom, a seed wheel rotatably mounted in said cup, a rock shaft, a valve loosely mounted on said rock shaft to close the open bottom of said cup, a fixed projection on said rock shaft, and a spring between said projection and valve to hold said valve yieldingly in its adjusted position.

7. In a seed distributer, a seed cup, a feed wheel therein, a pivoted valve coöperating with said wheel to form a measuring channel, means for adjusting said valve to regulate the size of said channel, a chart corresponding to the character of the seed to determine the position of said adjusting means, devices for moving said wheel longitudinally through said casing, and a chart corresponding to the quantity of seed to be sown to determine the adjustment of said devices.

8. In a seed distributer, a seed cup formed with an open bottom, a rotatable feed wheel in said cup, a pivoted valve coöperating with said wheel to form a measuring channel, means for adjusting said valve for determining the height of said channel, a chart corresponding to the character of the seed for determining the position of said adjusting means, a cut-off coöperating with said valve to regulate the width of said channel, devices for moving said wheel longitudinally through said cup to determine the quantity of seed to be sown and also for simultaneously moving said cut-off therewith, and a chart for determining the position of said devices.

In testimony whereof, we have hereunto set our hands this fifth day of August, 1912.

SYLVESTER H. JONES.
EDWARD CHRISTMAN.

Witnesses as to the signature of Sylvester H. Jones:
E. G. BUEKER,
FRED J. CARR.

Witnesses as to the signature of Edward Christman:
W. A. SPINDLE,
JAS. T. A. BAKER.